United States Patent [19]

Young et al.

[11] Patent Number: 4,846,436
[45] Date of Patent: Jul. 11, 1989

[54] POWER ASSISTED EQUIPMENT MOUNTING SYSTEM

[75] Inventors: Sheldon E. Young, Darien; Michael L. Young, Western Springs; Jerry D. Folkens, Westmont, all of Ill.

[73] Assignee: Vibro Dynamics Corporation, Broadview, Ill.

[21] Appl. No.: 59,126

[22] Filed: Jun. 8, 1987

[51] Int. Cl.[4] .............................................. G01L 5/00
[52] U.S. Cl. .................................... 248/542; 248/638; 248/650; 248/677; 248/188.4; 73/862.54
[58] Field of Search ............... 248/542, 543, 550, 615, 248/616, 637, 635, 638, 649, 650, 677, 405, 634, 188.4; 52/126.5, 126.6, 126.7; 73/862.54, 865.9

[56] References Cited

U.S. PATENT DOCUMENTS

| | | | |
|---|---|---|---|
| 2,660,387 | 11/1953 | Roy | 248/638 |
| 2,779,559 | 1/1957 | Bertuch | 248/638 |
| 3,315,923 | 4/1967 | Young | 248/677 |
| 3,332,647 | 7/1967 | Young | 248/615 |
| 3,351,309 | 11/1967 | Harrison | 248/650 |
| 3,455,526 | 7/1969 | Orii | 248/188.4 |
| 3,592,423 | 7/1971 | Mui | 248/188.4 |
| 3,598,353 | 8/1971 | De Grey | 248/638 |
| 3,815,852 | 6/1974 | May | 248/677 |
| 4,047,427 | 9/1977 | Young | 73/862.65 |
| 4,135,392 | 1/1979 | Young | 73/862.54 |
| 4,592,532 | 6/1986 | Stith, Jr. | 52/126.5 |

FOREIGN PATENT DOCUMENTS

| | | | |
|---|---|---|---|
| 83462 | 7/1956 | Netherlands | 248/616 |
| 115562 | 10/1968 | Norway | 248/188.4 |
| 217322 | 11/1967 | Sweden | 248/650 |
| 1563858 | 4/1980 | United Kingdom | 248/649 |

Primary Examiner—Ramon O. Ramirez
Assistant Examiner—Robert A. Olson
Attorney, Agent, or Firm—Neuman, Williams, Anderson & Olson

[57] ABSTRACT

An adjustable mounting is provided for use between the foot of a machine and the floor where the machine is located, as well as a method for adjusting the height of the foot. The mounting comprises a bearing member and a compressible cushion member which supports the bearing member, as well as an adjustable member which maintains the bearing member in spaced relation with the supporting member. A lifting member is interposed between the bearing member and the supporting member and is extendable to move the supporting member away from the bearing member without reducing the deflection of the cushion member. The portion of the adjustable member between the bearing member and the supporting member may be readily altered while the load of the machine is borne by the lifting member. A series of the mountings may be located beneath the several feet of the machine, and their height adjustments coordinated to assure levelness of the machine bed without deflection of the bed or stressing the machine with a change of attitude.

22 Claims, 5 Drawing Sheets

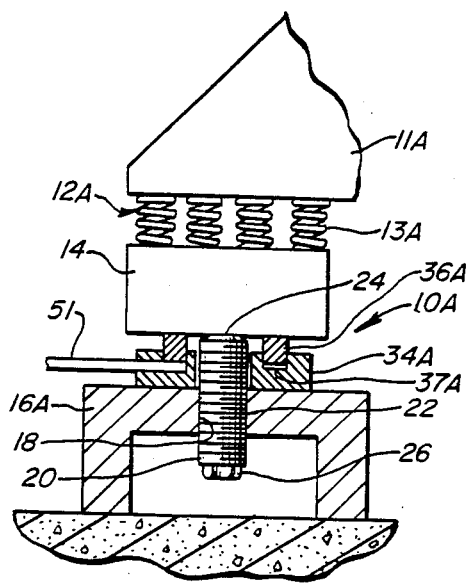
FIG. 5
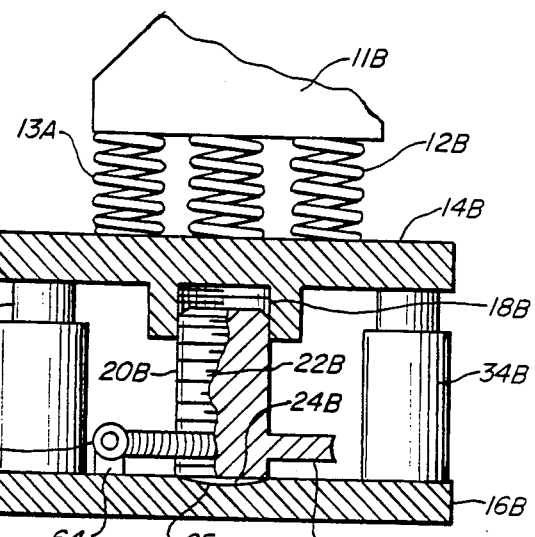
FIG. 6
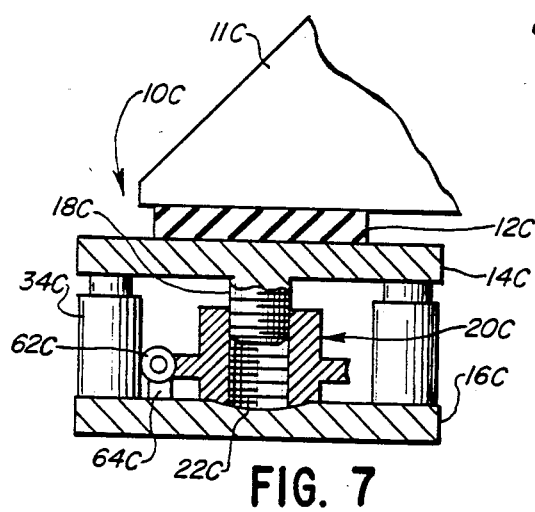
FIG. 7
FIG. 8
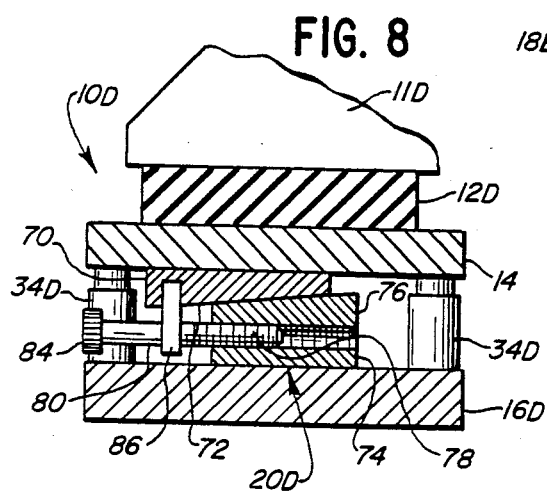
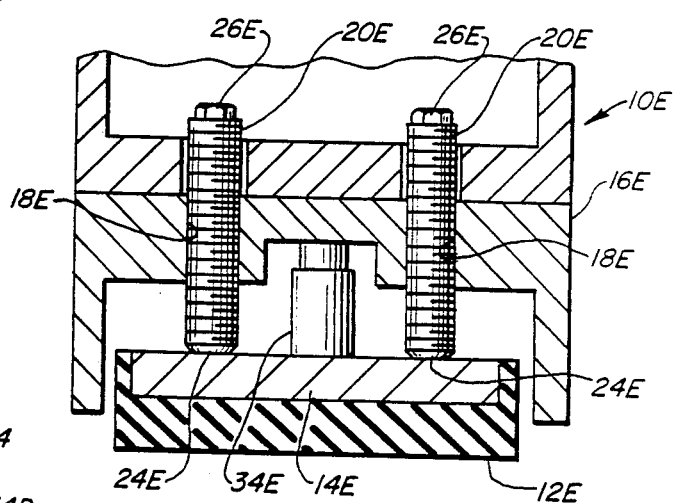
FIG. 9

POWER ASSISTED EQUIPMENT MOUNTING SYSTEM

BACKGROUND OF THE INVENTION

Many types of industrial equipment, such as machine tools, production presses, and other similar heavy equipment pieces, transmit objectionable levels of dynamic shock and vibration forces to the floor areas where they are located during the time they are operating. Also, many types of industrial equipment such as inspection equipment, tool room equipment, machine tools, and others are adversely affected by shock and vibration which may be transmitted to them through the factory floors or foundations on which they are mounted. Additionally, most mechanically operable industrial equipment is susceptible to misalignment, such as, by twisting, sagging or bending, by reason of an uneven floor on which the machine feet are supported, by distortions in the floor due to load or dynamic forces exerted upon the floor by other equipment, and by subsequent settling of the floor. When a machine is not properly aligned, tools, dies and machine components such as bearings or guides are likely to develop excessive friction, waste energy, and wear out faster.

For many years, factory installation and maintenance personnel have attempted to alleviate these problems by using resilient mounts to cushion vibration or shock and by painstakingly shimming up the equipment at various support points to improve alignment. Such equipment is sometimes bolted to the factory floor or to a massive foundation in an attempt to hold it securely in place. The inadequacy of these procedures for optimizing equipment performance has become increasingly apparent to those who have made a serious study of the operational dynamics of industrial equipment. Moreover, as production equipment continues to become more sophisticated and costly, it is increasingly apparent that a more scientific approach is needed, not only to the initial installation of such equipment, but also to continuously monitoring its performance thereafter over a long period of time.

Machine beds are designed to be level and flat to very close tolerances in order for the tools therein to produce parts to close tolerances required and to keep the dies from wearing out prematurely. When the feet of a machine are set down directly floor which is not level or flat, the machine bed is prevented from being level or flat as originally constructed. This interferes with the ability of the machine to do precise work and causes undue wear and tear on the machine, and its operating parts.

Adjustable mountings, such as those covered by U.S. Pat. Nos. 3,332,647 and 4,047,427, are designed to support machines on an uneven floor in such a manner that the bed of the machine is both level and flat to extremely close tolerances. Each mounting is comprised of a support housing for supporting one of the machine's feet; a resilient cushion for cushioning impact forces, for isolating vibration, and for reducing noise; a bearing member for distributing weight and dynamic forces uniformly over the area of the resilient cushion; and a member, called an adjustment member, for adjusting the space between the bearing member and the support member. Hereinafter, familiarity with these mountings will be assumed.

In installations where the machine bed is not level, the adjustment members in the mountings supporting the low side of the machine are adjusted to increase the spacing between the bearing members and support members in those mountings, thus raising that side of the machine until the bed is level in that direction. A machinist's level is usually used for detecting which way the machine bed is sloping and for determining how low that end of the machine is, as well as for determining when to stop adjusting the adjustment members. This procedure is repeated in a direction 90 degrees from the first.

However, levelness in the ordinary sense of the word is not enough to assure proper performance of the machine.

Machines can be leveled to close tolerances and yet be distorted to the point that the wear and tear on the machine and its tools and dies is excessive. For example, it is very important that the bed of a press be flat, as well as level over its entire surface. Most builders of precision machines specify that the level of the bed along each of its four edges be within 0.0005"/ft. in order to achieve the high degree of flatness needed for the machine to work properly. This is usually determined by placing a precision machinists's level on the bed parallel to and close to the four edges of the bed and adjusting the support under each of the four mounting feet until the "bubble" in the vial of the precision machinist's level is within one line of center.

Before the development of precision adjustable machine mountings such as those covered by U.S. Pat. Nos. 3,332,647 and 4,047,427, the only way to attempt to level presses was by setting the machine down, checking the level of the bed at four locations, raising one or more feet off the floor with a jack or pry bar, inserting shims under the feet, lowering the machine, checking the level again at all four locations, and repeating this procedure usually many times. Very seldom, however, were machines leveled to these tolerances, even after many hours and even weeks of time spent on levelling so that they could remain supported to the builder's specified tolerances. The few machines that were originally leveled to close tolerances soon became out of tolerance when shims shifted as a result of the dynamic forces involved in the operation of the machine, or when the floor became distorted when other equipment was moved, or when the floor settled. It took only a few thousandths of an inch of floor distortion or settling to cause a hard mounted machine (one mounted hard to the floor) to lose the levelness and flatness specified by the machine builder.

With the development of the adjustable mountings described in U.S. Pat. No. 3,332,647, it becomes possible to level machines to the close tolerances specified by machine builders over the entire bed of the machine and to do so more quickly and more permanently. These mountings served the additional purposes of controlling vibration and noise and reducing the transmitted impact or shock forces. Simply by adjusting the adjustment member in one or more of the mountings, i.e., the movable member regulating the distance between the member on which the machine foot rested and a second bearing member supported on a well designed cushion member on the machine room floor, it was possible to level the machine to the close tolerances specified by the machinery builders at all four locations on the bed where the precision machinist's level was intended to be placed. In fact, it was found that with these mountings, it was possible to adjust the mountings to achieve even more precise leveling than the 0.0005"/foot tolerances specified by the machine builders, and to do so quickly.

It has been found that this added precision is highly conducive to optimum machine performance and reduced wear and tear on a wide variety of equipment such as a press, and on tools and dies used therein, and the like. This precision is made possible by the combination of two important features of the mountings. These features are (1) a highly precise adjustment member, and (2) the characteristics of the cushion members.

When a machine with four (or more) mounting feet is set down "hard" on a floor, that is in direct contact with a floor and without a cushioning member to absorb vibrations transmitted out of and/or into the machine, differences in floor elevation under the four feet will cause the machine bed to be out of flat, i.e., to have some portions out of a planar surface. For example, if the elevation of the floor under one foot is higher than it is under the other three feet, most of the weight of the machine will be supported by the floor under two mounting feet, namely, the foot at which the floor is high and its diagonally opposite partner, while relatively little of the machine weight will be supported by the floor under the other two mounting feet. Thus, the machine will sag down at the two diagonally opposite corners which are inadequately supported, relative to the two diagonally opposite corners which are excessively supported.

Some machines have been equipped with level adjustment screws which are threaded into tapped holes in the machine feet. The bottom ends of the screws rest directly on the floor. Turning the screws raises or lowers the machine feet when one attempts to level the machine. Such hard mounted leveling devices are capable of rough leveling. However, without the cooperative effects of the resilient member, it is virtually impossible to turn the screw a small enough amount to control height to within the few thousandths of an inch necessary for precision leveling even if the level adjustment screw has a very fine thread. For example, in order to raise or lower a corner of a machine by 0.001", it is necessary to turn a hard mounted leveling screw with 12 threads per inch precisely one eighty-third (1/83) of a turn.

Even if it were possible to make such a small adjustment, it is difficult to maintain a machine in a precisely level condition when such things occur as a lift truck coming by, or another machine being installed nearby, causing vibration of the floor, or repeated or permanent deformation of the floor as a result of these changes. Any such deformation in the floor almost always causes a resultant deformation of a machine which is hard mounted on the floor.

Likewise any permanent settlement of a foundation or floor under one of the machine mounting points reduces the support given to that corner of the machine, as well as the support given to the opposite corner, while it increases the support given to the other two corners. It does not take many thousandths of an inch of floor settlement to have a profound effect on machine flatness and alignment.

It is also very difficult to maintain alignment of machinery that is hard mounted on leveling screws due to dynamic forces caused by the operation of the machine itself and also by dynamic motions of the floor caused by other equipment or vehicles operating nearby. Such dynamic forces cause two types of problems; one, they cause dynamic deformations in the machine during the time the dynamic forces are occurring; and two, they tend to cause the leveling screws to turn, thus losing their adjustment, which causes deformations to continue to exist even after the dynamic forces stop occurring.

When a machine supported on four of the mountings described in U.S. Pat. No. 3,332,647 is set down on the same floor, the distribution of support force will be initially more uniform due to the resiliency of the resilient member in each of the mountings. Therefore, the machine bed will be flatter from the outset, although not necessarily perfectly flat. What deviation does exist can be easily and promptly alleviated by adjusting the adjustment member in at least one of the mountings to distribute the support force even more uniformly.

The resilient member in the mounting supporting the leg at the location where the floor elevation is high and the resilient member in the mounting supporting the diagonally opposite leg will deflect more than the resilient members in the two other mountings due to the difference in spacing between the floor surface and the bottom of the machine feet. The difference in the reaction force with which the various mountings support their respective mounting points is a function of the stiffness of each resilient member and the difference in deflection of the various resilient members. Therefore, for a given difference in elevation, the lower the stiffness, the more uniform will be the force with which the four mountings will support the four corners of the machine. Consequently, the lower the mounting stiffness, the closer the bed will be to a planar surface even before the adjustment member in any of the mountings is adjusted.

It should be especially noted that adjustment of the adjustment member in one of the mounts to bring the machine bed into an almost precisely flat plane is made more accurate due principally to the resiliency of the resilient member in combination with the precision adjustment member, which is preferably a screw threaded element. In this combination, several phenomena occur simultaneously. When the adjustment member in one of the four mountings is adjusted to increase the space between the bearing member (normally adjacent the resilient member) and the support member (normally adjacent the foot of the machine):

(1) the support housing of that mounting and the machine leg supported on that mounting are raised;

(2) the bearing member is pressed down with a greater compression, thus increasing the deflection in the resilient member in that mounting;

(3) the compression in the mounting supporting the opposite corner of the machine is increased; and (4) the compression in the mountings supporting the other two corners of the machine is decreased.

Thus, by adjusting the adjustment member in one of the under-supported mountings, it is possible to correct an out-of-flatness condition. By adjusting the adjustment members in three of the mountings, it is possible to also support the bed of the machine in a level and flat condition to extremely close tolerances.

It is also possible to maintain the machine bed level and flat due to the effectiveness of the resilient member in keeping distortions in the floor, such as are caused by changes in floor loading, from distorting the machine and in preventing dynamic forces acting on the floor by other machines from affecting machine alignment, either during the dynamic disturbance or subsequent thereto.

Pertinent also to an understanding of the present invention is the fact that further research on the mountings shown and described in U.S. Pat. No. 3,332,647 referred to above revealed that in some cases machine performance could be increased even further by using improved mountings which are described in U.S. Pat. No. 4,047,427. Those mountings each incorporate a load sensor which transmits a signal corresponding to the force with which each mounting supports its respective machine foot. By adjusting the adjustment member in a mounting of this type while observing the force indicators associated with the four mountings, it is possible to achieve a uniform distribution of the forces with which the two pairs of diagonally opposite mountings support their respective machine feet. Thus, adjustment of the adjustment members in the several mounts will support the machine so its bed is in a horizontal plane to even closer tolerances, in some cases even more precisely than those specified by the machine builder. With a little care, it is easy to level machines more accurately than a machinist's level is capable of measuring. In this condition, the machine is capable of producing the most precise parts possible, thereby maximizing both productivity and product quality, with no wear and tear and no downtime due to foundation-induced misalignment.

The mounting types described in U.S. Pat. Nos. 3,332,647 and 4,047,427, which are equipped with threaded adjustment members are now being used to level and isolate heavier and heavier machinery that is so large and heavy that many times it is impossible to manually adjust the adjustment members.

In the case of light machines, the adjustment member may be easy to adjust manually, simply by using a wrench. For heavier machines, the increased normal force on the threads and on the end of the adjustment member make it harder to adjust. For extremely heavy machines, the normal forces are so great that even with the aid of the most effective lubricants it becomes impossible to apply enough manual force or torque to adjust the adjustment member.

In such cases, it has been found necessary to use auxiliary lifting means, such as an hydraulic jack, to lift one corner or one side of the machine to reduce the load on the adjustment member sufficiently to make it possible to adjust it. With the assistance of the jack, it has become possible to support machines weighing as much as a million pounds and even greater, on four mountings such as those covered by U.S. Pat. Nos. 3,332,647 and 4,047,427, and to adjust the adjustment member in each such that the bed of the machine is level and flat to the very close tolerances mentioned above. With the mountings disclosed in U.S. Pat. No. 4,047,427, it is also possible to adjust them to uniformly distribute the forces with which the mountings support extremely heavy machines.

Most heavy machines such as automotive presses are "pit mounted." The bed of such a machine is so deep that the machine feet extend out from the bed at a higher elevation than the bottom of the bed. The feet are supported either on beams or on piers, sometimes as high as 20 feet above the bottom of the pit, and the personnel operating the machines are located on a floor 25 to 30 feet above the bottom of the pit. Often, there is no place to locate a jack on the beam or pier, in which case, in order to lift a corner of the machine, it is necessary to construct a temporary structure from the bottom of the pit to support the jack.

Whether a machine be floor mounted or pit mounted, in any case in which a jack or other lifting device is used in the manner described above to make an adjustment of an adjustment member, one corner of the machine must be raised a sufficient amount to remove most of the static deflection in the resilient cushion member. Even to make adjustments of a few thousandths of an inch, the corner of the machine at the mounting to be adjusted may have to be raised ten times as far, or more, in order to permit that fine of an adjustment.

In the case of a machine supported on three mountings, in order to adjust the adjustment member in one of the mountings, that corner or end of the machine must be raised more than the amount needed to level the machine in order to make even the slightest adjustment of the adjustment member.

In the case of a machine supported on four mountings the problem becomes even more complex. When one corner is raised to permit adjustment of the adjustment member, activation of the jack causes the machine to lean in the direction of the diagonally opposite corner, increasing the load on, and the deflection of, the mounting supporting the opposite corner, while decreasing the load on, and the deflection of, the mounts supporting the other two corners.

Thus, even though the just-described adjustable mountings which have been developed heretofore have been great advances in achieving optimum support for heavy machines, and even though the just-described procedures have proven to be less costly and time consuming than earlier methods, further improvements in accordance with the present invention have been made which result in even greater precision, lower cost, and lower time consumption, as will now be described.

SUMMARY OF THE INVENTION

The present invention relates to improved adjustable mountings in which a lifting member is contained within the mounting such that actuation of the lifting member does not decrease the deflection of the resilient member and, also, raises the elevation of a corner of the machine only enough to achieve an amount of adjustment needed to obtain a precision levelness and flatness of the machine bed. The present invention also achieves an optimum distribution of the forces with which the mountings support their respective machine feet.

OBJECTS OF THE INVENTION

Accordingly, it is an object of this invention to provide a machinery mounting system comprising a plurality of mountings each of which includes a bearing member and a support member gradually separable from one another by a distance adjustment member, the bearing and support members being movable from one spaced-apart position to another to change an out-of-level condition of the mounted machine to a level condition without causing the parts of the machine to travel more than the distance needed to correct the out-of-level condition, and a lifting member disposed between the bearing and support members movable to space them apart temporarily a sufficient distance to remove a portion of load from the adjustment member so that adjustment thereof can be easily made.

It is a further object of the present invention to provide a machinery mounting system comprising a plurality of such mountings capable of correcting an out-of-flatness or out-of-alignment condition without causing the machine to be forced beyond the change in flatness or alignment necessary to correct such condition in the process of activating the lifting member in one mounting or another to remove a sufficient portion of load from the adjustment member in the activated mounting to permit adjustment thereof.

It is yet a further object of the present invention to provide a machinery mounting system comprising a plurality of such mountings capable of improving the distribution of force with which the various mountings of the plurality of mountings support the machine weight without causing any deterioration in the distribution thereof in the process of actuating the lifting member to remove a sufficient portion of load from the adjustment member to permit adjustment thereof.

It is also an object of the present invention to provide a method of reducing the height of such a mounting such that activation of the lifting member and subsequent backing off of the adjustment member does not result in a substantial change in the support load of the machine foot when the load is transferred from the lifting member to the adjustment member upon deactivation of the lifting member.

Other and further objects of the invention may be determined from the accompanying drawings and the following detailed description.

In one of its preferred forms, the present invention is embodied in an improved, adjustable, machinery mount comprising a compressible resilient member, a bearing member disposed in supporting relationship with the resilient member, a supporting member including an internally threaded opening therein, with an adjustment member extending intermediate the bearing member and the supporting member. Once adjusted, the adjustment member is capable of maintaining the bearing member in spaced relation to the supporting member. The adjustment member has a first portion along its length with external threads for axially rotatable engagement in the internally threaded opening in the supporting member, and a second portion in abutting engagement on a surface portion of the bearing member. A lifting member is interposed between the bearing member and the supporting member, and is capable of applying force between the bearing member and the supporting member so as to lift a portion of the load off of the adjustment member without removing any of the load from the resilient member or reducing the deflection thereof.

In another form, a sensor is incorporated in the mounting or on the machine supported thereby which is capable of producing a signal corresponding to the force with which the mounting supports the portion of the machine under which it is located. In still another form separate sensors may be incorporated which are capable of producing signals corresponding to the load on the adjustment member and on the lifting member simultaneously. In either form the signal is translated into commands transmitted to the lifting member to move it as needed for permitting adjustment of the adjustment member without a load being imposed thereon during adjustment. Thus, the lifting member may be moved, as needed, for optimizing the support force at each machine mounting location to obtain a level and aligned condition of the machine, and for permitting adjustment of the adjustment member while holding the spaced relationship between the support member and the bearing member constant.

In still another form, the lifting member is actuated by fluidic pressure transmitted to the lifting member, and a transducer located therein produces a signal corresponding to the pressure in the lifting member or fluid line connected to the lifting member.

DESCRIPTION OF THE DRAWINGS

Further aspects and features of the present invention will become apparent after considering the accompanying drawings in which

FIG. 5 is a modified form shown in cross-section of a portion of the isolating amount shown in FIG. 1;

FIG. 6 is another modified form shown in cross-section of a portion of the isolating mount shown in FIG. 1;

FIG. 7 is another modified form shown in cross-section of a portion of the isolating mount shown in FIG. 1;

FIG. 8 is another modified form shown in cross-section of a portion of the isolating mount shown in FIG. 1;

FIG. 9 is another modified form shown in cross-section of a portion of the isolating mount shown in FIG. 1.

DETAILED DESCRIPTION OF THE PREFERRED EMBODIMENT

Figures 1, 2:
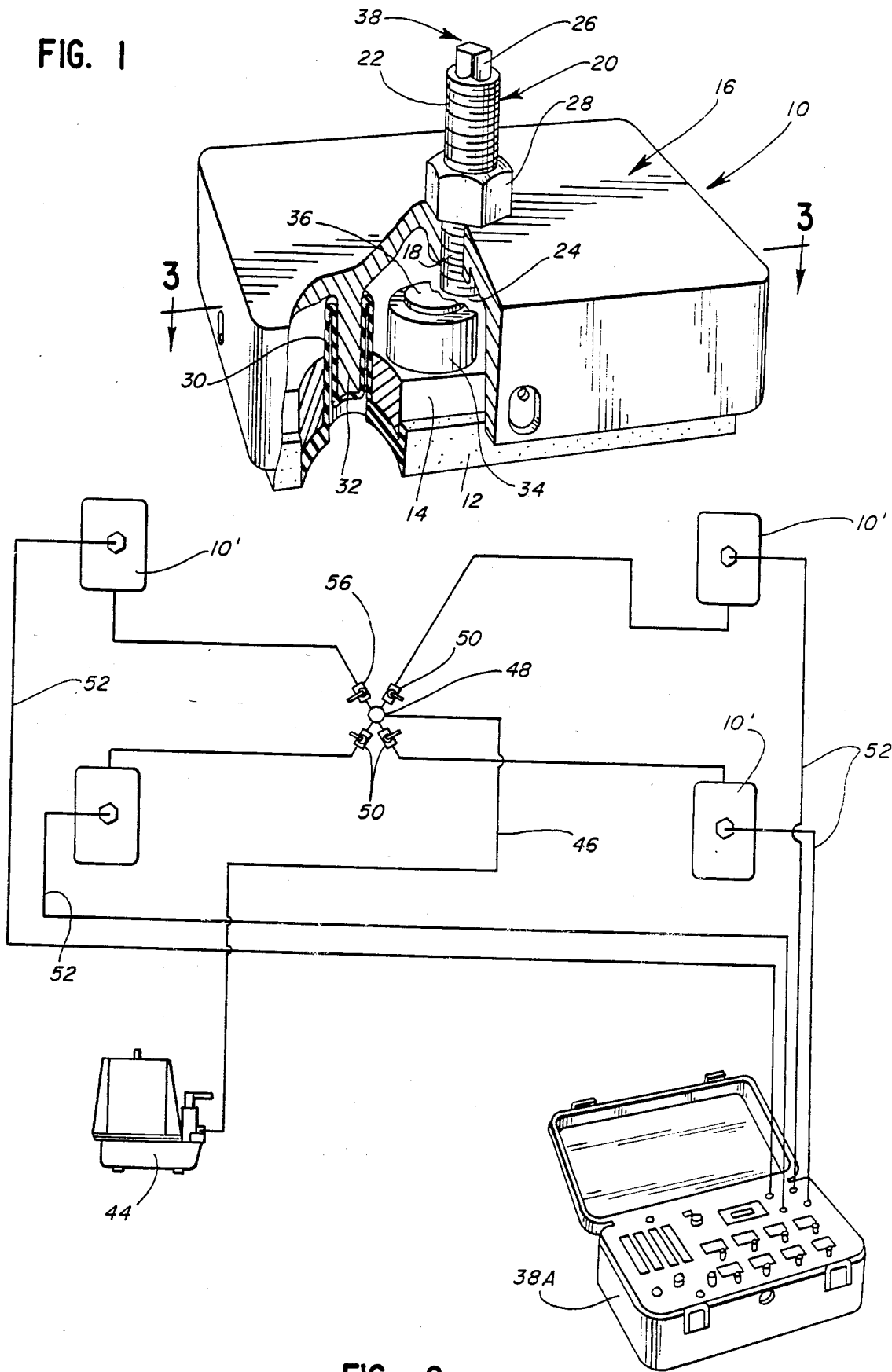
FIG. 1 is a perspective view of an improved adjustable vibration isolating mount partially cut away.
FIG. 2 is a diagrammatic arrangement of four of the isolating mounts shown in FIG. 1 disposed in a system in which they are motivated and monitored from a connected power source and electronic monitor and control box.

As depicted in FIG. 1, the isolating machinery mount 10 incorporates an elastomeric cushion member 12 which is ordinarily compressible and resilient. The cushion member 12 rests on the floor of a building (not shown) in which a piece of machinery, is located (also not shown) so that one foot of the machine may be positioned on the mount 10 in the manner shortly to be described. The cushion member 12 is disposed in immediate supporting relationship below a bearing member or plate 14. Above the bearing member 14 a machinery supporting member 16 is arranged, normally of such a size that a foot of a machine to be supported will be engaged on the uppermost planar surface thereof. A threaded aperture 18 is positioned in the supporting member 16 so that an adjustable member 20, having external threads 22 on a first portion thereof, can be rotatably engaged in the supporting member 16. The adjustable member 20 also includes a second portion 24 which abuts the top surface of the bearing member 14. The adjustable member is shown with a wrench engagement portion 26 which may be utilized for turning the adjustable member and thus vary the distance between the machinery supporting member 16 and the bearing member 14. A locking nut 28 is also provided to fix the adjustable member in place relative the machinery supporting member 16 once the adjustable member has been placed in its desired position.

It will be evident from an examination of FIG. 1 that the machinery supporting member 16 is spaced away from the lowest surface of the elastomeric cushion 12. Thus, the vibrations from any floor or foundation below the cushion will be dampened and not fully transmitted to any equipment resting on the machinery supporting member 16. Similarly any vibration or impact forces generated by the operation of a machine resting on member 16 will be only partially transmitted to the floor through member 16 and adjustable member 20. The bearing member 14 distributes those forces over the upper surface of the cushion member 12.

Cushion member 12 is not bolted in any way to the floor, but it is engaged to the machinery supporting member by means of a plurality of hollow grippers, one of which is shown at 30 in FIG. 1. A complementary finger-like element 32, extending down from the bottom surface of the machinery supporting member 16 is disposed within the hollow gripper element 30 to provide a secure but flexible engagement between the cushion member 12 and the machinery supporting member 16. The engagement herein described is more fully elaborated in U.S. Pat. No. 3,332,647.

Located adjacent the adjustable member 20 is a lifting member 34, which may be a hydraulic jack, having a piston head 36 oriented to engage the bottom side of the machinery supporting member 16 when the piston within the hydraulic jack 34 is activated. It is desirable to have a plurality of lifting members 34 interposed between the bearing member 14 and the machinery supporting member 16, arranged according to the plan in FIG. 3, so that the downward forces applied by the plurality of lifting members to the bearing plate are symmetrical about the center of the resilient member to prevent tipping of the bearing member.

Figure 3:
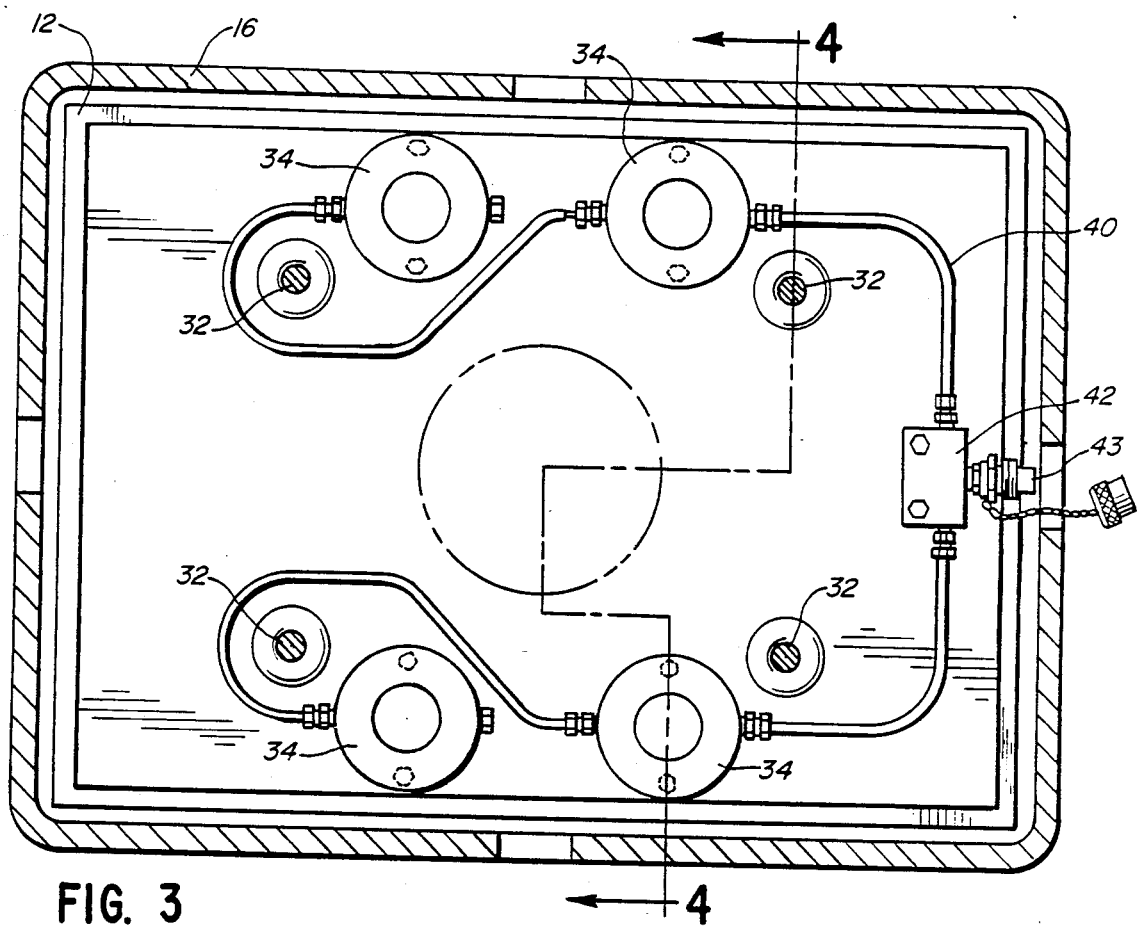
FIG. 3 is a plan view of the isolating mount shown in FIG. 1, taken along the line 3—3 in FIG. 1.
Figure 4:
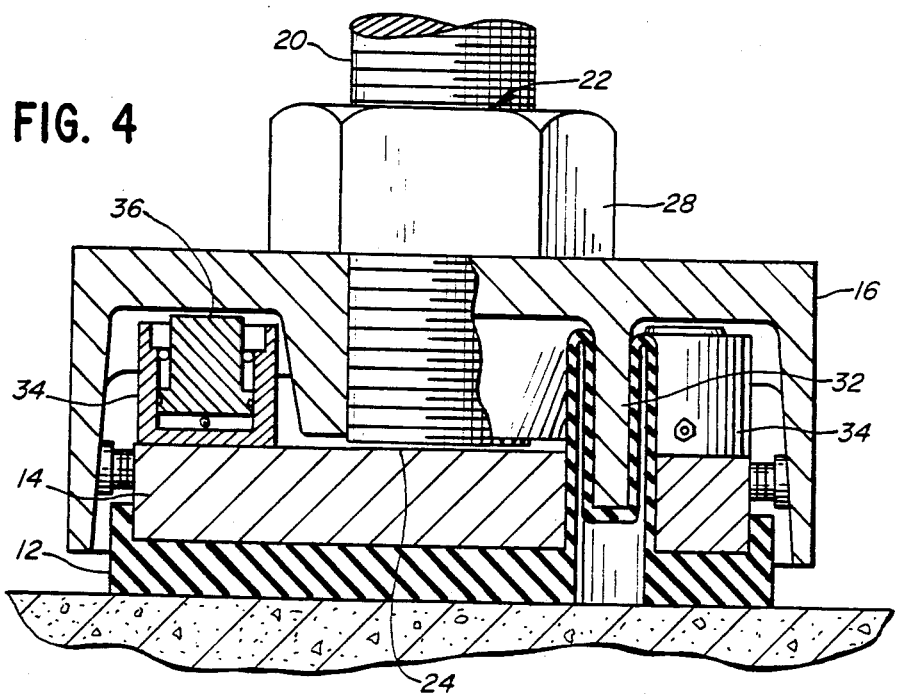
FIG. 4 is a sectional view of the isolating mount shown in FIG. 3, taken along the line 4—4 in FIG. 3.

Also, the mount 10 may be provided with a load sensor as described in U.S. Pat. No. 4,047,427 in which the mount is provided with a connection 38 to transmit a signal for reading the amount of load on the mount 10 back to a control box 38A (See FIG. 2). In this manner, individual measurements of the force with which the mounting supports a leg of a machine can be instantaneously and continuously obtained, and the lifting member 34 activated whenever necessary. When there is a plurality of lifting members 34, within a single machinery mount unit 10, arranged as shown in FIG. 3, each of the lifting members 34 is connected through a high pressure hose line 40 and T-connector 42 back to a quick disconnect fitting 43 and thence to a source of hydraulic fluid, as will shortly be explained. Thus, all of the lifting members may be operated simultaneously from the pressure fluid source.

As shown in FIG. 2, a pump 44, which may be a hydraulic pump, may be connected through hose line 46 to a manifold 48 and fluid from the pump directed thereto. From the manifold, the fluid may be directed through control valves 50 through a series of hydraulic lines 51 to a series of isolating machinery mountings 10' identical to the mount 10 shown in FIG. 1. When it is assumed that the mountings 10' are located under the legs of a machine, one at each corner of the machine, it will be apparent that each one of the legs may be individually raised or lowered to support the machine in a manner such that the levelness and flatness of the bed are optimized. In cases where the machinery mounts are equipped with load sensors, the control box 38A, which is connected through electrical lines 52 to the mountings 10', may be utilized to determine the force with which each of the mountings supports its respective leg and when the mountings have been adjusted to achieve an optimum distribution of the forces with which the mountings support the legs.

Referring to FIG. 1, when the lifting member 34 is activated, there can be substantial lifting force brought to bear between the support member and the bearing member and thus release most of the normal force between the sets of threads engaged between the adjustment member and the support member without reducing the load on or deflection of the resilient member. This is because the reduction in load on the adjustment member is achieved by transferring the load to the lifting member, both of which are supported on the same bearing member which in turn is supported on the resilient member. Thus, a corner of the machine needs to be raised by only the infinitesimal amount corresponding to the reduction of the shear strain distortion in the mating threads of the adjustment screw and support member required to permit adjustment of the adjustment member. As a result, the machine need not be leaned toward the opposite corner when the lifting member is activated to permit, or during, leveling of the machine.

The activation of the lifting member need be, and normally is, no longer than is necessary to turn the adjustment member, which may be rotated easily using either a wrench as a handle or only a $\frac{1}{2}''$ diameter rod 6" long which will fit into holes (not shown) in the head 26 of the adjustment member, since there will not be the full weight of the machine on the threads to hinder that rotation. Once the adjustable member 20 is turned to support the support member in the desired new position, the lifting member may be relaxed to permit the weight of the machine to rest fully upon the adjustable member 20 again. It will be noted that throughout the adjustment procedure just described the weight of the machine supported by the lifting member did not reduce the force on the elastomeric cushion member nor reduce the support provided by the cushion member to the machine foot. Thus, there can be an easy, rapid leveling of large equipment in place.

The scope of this invention is not limited to the details of the preferred embodiment described above, and its mechanical relationships may be incorporated in various combinations. For example, the adjustable means is not limited to a threaded member, but can be any means by which the space between the machinery support member and the bearing member can be adjusted either continuously or incrementally; there need not be a threaded hole in the machinery supporting member; the resilient cushion member may be a spring or series of springs, an air cushion, or any other compressible member or assembly; the mount may be boltable or attachable to the floor; the lifting device may be any means for relieving force from the adjustment member; the adjustable member may be threaded into or around either or both the machinery support member and/or bearing member; one annular jack can be used surrounding the adjustment means to provide symmetrical distribution of the lifting load or one lifting member may be used surrounded by several adjustment members.

In certain applications, for example in FIGS. 5 through 9, it may be found advantageous to modify the form of mounting 10 to the forms 10A, 10B, 10C, 10D or 10E. One may find it desirable to install the mounting upside down, as compared to the position shown in FIG. 1, so that the resilient member 12A, 12B, 12C, or 12D will be directly under the machine foot 11A, 11B, 11C or 11D as in FIGS. 5, 6, 7, and 8, respectively. The resilient member may be one or more springs 13A as in FIGS. 5 and 6. An annular lifting member 34A may be interposed between bearing member 14 and supporting member 16A and may be symmetrical with and surrounding adjustment member 20, as in FIG. 5, for example. An annular piston member 36A in an annular groove 37A disposed in the body of lifting member 34A (See FIG. 5) may be used in order to provide uniform upward pressure on the bearing member 14 and thus on resilient member 12A so as to prevent tipping of the bearing member 14 upon activation of lifting member 34A.

Referring to FIG. 6, the adjustment member may be an adjustable threaded means 20B with external threads 22B engageable with internal threads 18B in the bearing member 14B; the adjustable member 20B may be equipped with gear teeth 60 driven by another gear 62 supported on bearings 64 supported in turn by supporting member 16B in which a spherical seating surface 65 supports a spherical end 24B of adjustable means 20B.

Referring to FIG. 7, the adjustment means 20C may have internal threads 22C engageable with external threads 18C on the bearing member. Also, in another application, the adjustment member may be a wedge device 20D as in FIG. 8 interposed between support members 16D and bearing member 14 in which wedge device 20D is comprised of a wedge member 70 in supportable contact with bearing member 14, a second wedge member 74 is in supported contact with support member 16D, and adjustment member 80 is adjustable to move one wedge member 70 relative to the other wedge member 74 so as to vary the relative space between support member 16D and bearing member 14. Movement of the wedge members 70, 74 may be accomplished, when force is removed from the device 20D, by turning knob 84 on the end of adjustment member 80, thus moving the upper wedge member 70 by means of tab 86, as the body 78 of adjustment member 80 is turned, along the inclined face 76 of wedge member 74.

Referring to FIG. 9, it is contemplated further that in some applications the mounting 10 shown in FIG. 1 may be further modified as shown at 10E in FIG. 9 and may have two or more adjustment members 20E and one lifting member 34E. It will be noted that in the modified arrangement of elements shown in FIG. 9 all of the comparable elements are numbered with the same numbers as used in the description of FIG. 1, but because of the rearrangement they are given the suffix E.

Figure 10:
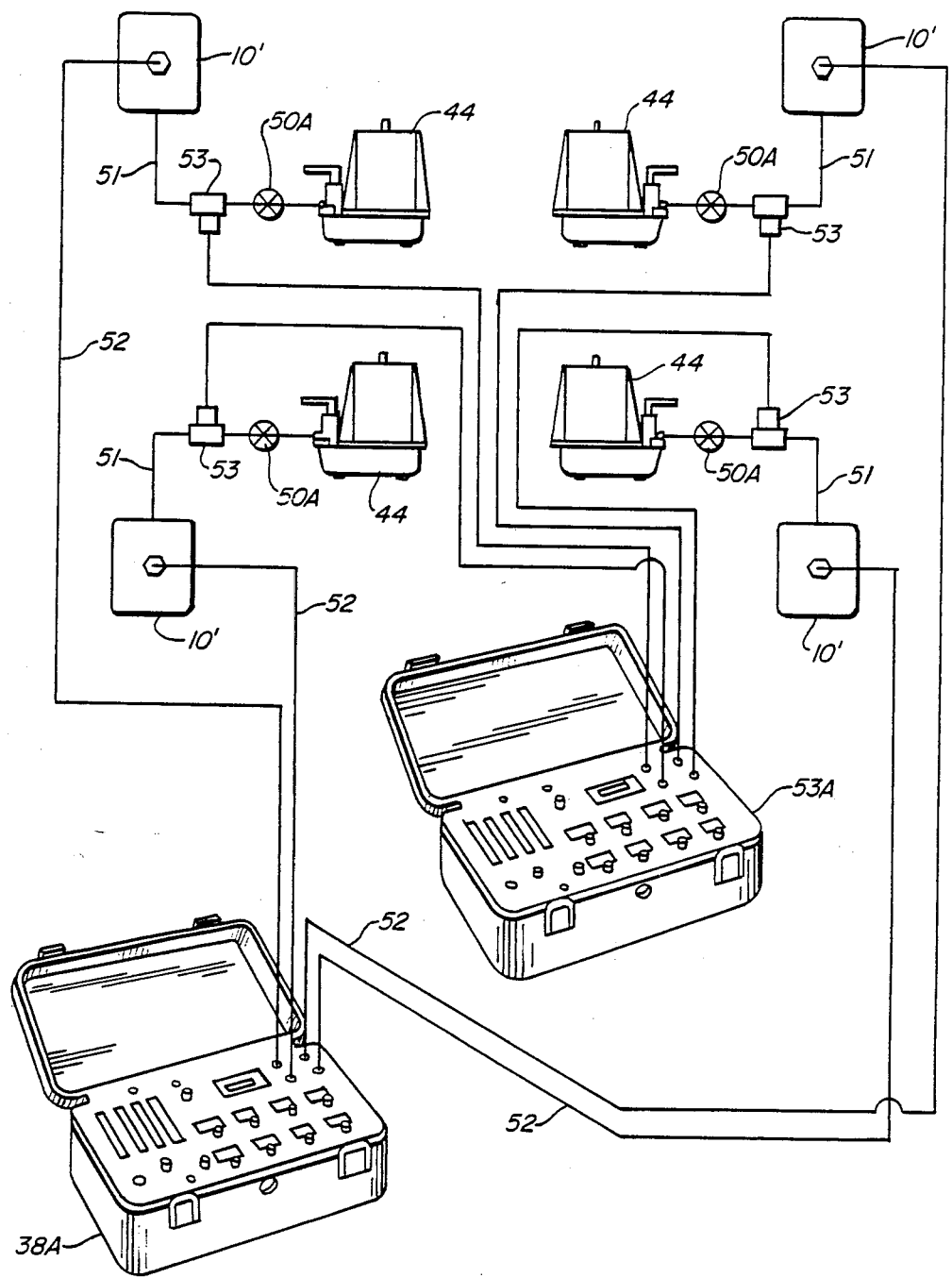
FIG. 10 is a diagrammatic arrangement of a system of mounts similar to those in FIG. 1 modified to incorporate load sensors capable of producing signals corresponding to the load on the adjustment member and lifting member in each mount in the system.
Figure 11:
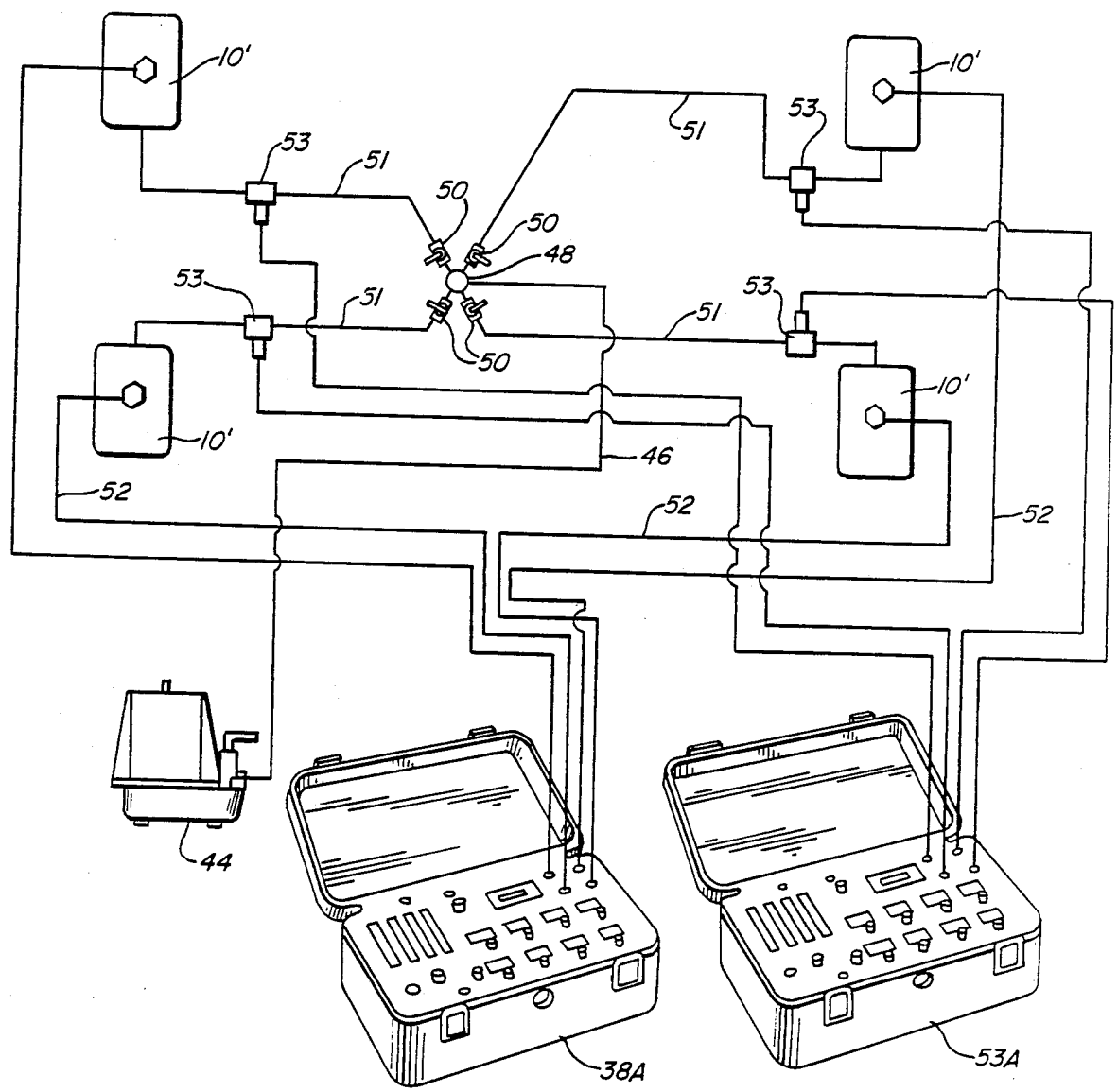
FIG. 11 is a diagrammatic arrangement of a modification of the system of mounts shown in FIG. 2 and illustrating methods of using the mounts shown in FIG. 1 for levelling equipment.

FIG. 10 shows another embodiment of the system illustrated in FIG. 1 and described above. The system shown in FIG. 10 includes pressure transducers 53 which are incorporated in hydraulic lines 51 connected to each of the mountings 10'. The pressure transducer 53 in each pressure line 51 transmits a signal corresponding to the pressure in each lifting member 34 to a force measurement instrument 53A. By reading the indicators associated with the lifting member 34 in one or more mountings 10', that portion of the load taken up by the lifting member 34 can be controlled precisely, thus preventing too much lifting of any corner of the machine and preventing tilting and distortion of the machine structure, which might occur if too much pressure were applied to the lifting member in one of the mountings.

By incorporating load sensors in the machinery mounts as noted previously, or pressure transducers 53 in the system, or both, it is possible to read the load in each mounting 10' on the force measurement instrument, calculate the optimum force with which each of the four mountings 10' should support its respective corner of the machine for optimum distribution, and then activate the lifting member 34 in one or more mountings 10' until the force measuring instruments 38A or 53A, or both, indicate that optimum support force distribution has been achieved; thereupon, the adjustment member 20 in each of the mountings 10' in which the lifting members 34 had been activated may be adjusted as needed, and thereafter lifting member 34 may be deactivated.

A further embodiment of the present invention incorporates an adjustable pressure regulator 50A, as shown in FIG. 10; such an adjustable pressure regulator can be preadjusted to provide each lifting member 34 with a predetermined lifting force. Thus, the force measurement instrument 38A may be read before final adjustment of adjustment members 20 to determine the existing distribution of force with which each of the four mountings 10' supports its respective corner of a supported machine. Thereafter, the optimum distribution of these forces may be determined, and then the pressure regulators 50A in each of the hydraulic lines 51 may be adjusted so that, upon pressurization of the system, precisely the correct pressure will be supplied to each of the lifting members 34.

In some applications, each pressure regulator 50A may be preadjusted to a value just slightly less than the optimum value calculated as above, thereby relieving the adjustment members 20 in one or more of the mountings of enough of the load to make it easy to adjust a load-relieved member 20 without raising the machine by means of the lifting member 34.

In other applications, it may be desirable to raise (or lower) the machine as well as to level it and provide uniform support for it, in which case the pressure regulators 50A may be set to a pressure slightly higher than that calculated for optimum support. Upon pressurization of the hydraulic system, the lifting member 34 in each mount relieves the adjustment member 20 in each of the mounts. In the case in which the machine is to be raised, when the machine reaches the desired elevation the adjustment member 20 in each mounting will be properly adjusted and the hydraulic system depressurized. Also, a switch (not shown) may be used to turn the hydraulic system off to prevent the machine from being elevated above the desired level.

Those skilled in the art will readily see that, while numerous detailed variations of the above-described embodiments of this invention may be made, the true scope of the invention is to be determined by the following claims:

We claim:
1. An improved, adjustable, mount comprising
a bearing member,
a compressible, resilient cushion member disposed in supporting relationship with the bearing member
a supporting member
an adjustable member having a portion intermediate the bearing member and the supporting member and maintaining the bearing member in spaced relationship with the supporting member, and a power-actuated jack interposed between the bearing member and the supporting member and extendable to space the supporting member in a direction away from the bearing member without reducing deflection of the cushion member.

2. The improved adjustable mount of claim 1 in which a portion of the adjustable member is threaded and in which the spaced relationship is changeable by rotating the threaded portion.

3. The improved adjustable mount of claim 1 which includes a sensor means for producing a signal corresponding to the load on at least one of the members in said mount.

4. The improved adjustable mount of claim 3 in which the sensor means is arranged to produce a signal responsive to the force on the jack.

5. The improved adjustable mount of claim 3 in which the sensor means incorporates a strain gage.

6. The improved adjustable mount of claim 3 in which the sensor means is arranged to produce a signal responsive to movement of the floor beneath the machine or of the machine portion supported by the mount.

7. The improved adjustable mount of claim 1 in which the jack is a fluidic jack attachable to a source of fluid under pressure by means of a fluid carrying line.

8. The improved adjustable mount of claim 7 in which a sensor means for producing a signal corresponding to the load on at least one of the members in said mount is located in the fluid carrying line or in the jack.

9. The improved adjustable mount of claim 7 in which a sensor means for producing a signal corresponding to the load on at least one of the members in said mount is located in the jack.

10. The improved adjustable mount of claim 7 in which a pressure regulator is located in the fluid carrying line adjustable to limit the pressure with which the lifting force supports the supporting member relative to the bearing member.

11. The improved adjustable mount of claim 1 in which the supporting member is a portion of the base of a support load.

12. An improved machinery mounting system comprising
a plurality of mounts at least one of which incorporates
a bearing member,
a compressible, resilient cushion member disposed in supporting relationship with the bearing member
a supporting member
an adjustable member having a portion intermediate the bearing member and the supporting member and maintaining the bearing member in spaced relationship with the supporting member, and
a power-actuated jack interposed between the bearing member and the supporting member and extendable to space the supporting member in a direction away from the bearing member without reducing deflection of the cushion member,
the jack being movable without resulting deflection of a cushion member in any of the other mounts more than an amount of deflection of the cushion member in the one mount resulting from adjustment of the adjustment member in the one mount.

13. An improved machinery mounting system for supporting the body of a machine comprising
a plurality of adjustable mounts disposed in supporting relationship with the machine body,
at least one of the mounts including
a bearing member,
a compressible, resilient cushion member disposed in supporting relationship with the bearing member
a supporting member
an adjustable member having a portion intermediate the bearing member and the supporting member and maintaining the bearing member in spaced relationship with the supporting member, and
a power-actuated jack interposed between the bearing member and the supporting member and extendable to space the supporting member in a direction away from the bearing member without reducing deflection of the cushion member,
the jack also being extendable a sufficient distance to permit changing the length of the adjustable member between the bearing member and the supporting member throughout a range of positions limitable to non-stressed positions of the machine body on the mounts.

14. An improved machinery mounting system for supporting the body of a machine comprising
a plurality of adjustable mounts disposed beneath and in contact with the machine body,
each of the mounts including
a bearing member,
a compressible, resilient cushion member disposed in supporting relationship with the bearing member
a supporting member
an adjustable member having a portion intermediate the bearing member and the supporting member and maintaining the bearing member in spaced relationship with the supporting member, and
a power-actuated jack interposed between the bearing member and the supporting member and extendable to space the supporting member in a direction away from the bearing member without reducing deflection of the cushion member,
the jack also being extendable a sufficient distance to permit changing the length of the adjustable member between the bearing member and the supporting member throughout a range of positions wherein the supporting member is disposed in a supporting position to the machine body and repositioning of the supporting member throughout the range is limited to changing the slope of the machine body to a level position throughout the range of the non-stressed positions of the machine body.

15. An improved machinery mounting system for supporting a machine comprising a plurality of mounts, each of which comprises
a bearing member,
means interposed between the bearing member and the floor of the area where the supported machine is located for supporting the bearing member
an adjustable member having a portion intermediate the bearing member and a portion of the supported machine for maintaining the spaced relationship therebetween,
a power-actuated jack interposed between the bearing member and the portion of the supported machine and extendable to remove at least a part of the load on the adjustable member during adjustment thereof, a sensor means for producing a signal corresponding to the load force with which the supported portion of the machine is supported, means for activating the jack independently to vary the load force on at least one of the other mounts, and means for indicating the distribution of load force with which the mounts in the system support their respective portions of the machine.

16. The improved machinery mounting system of claim 15 in which the means for supporting the bearing member is a compressible resilient cushion.

17. An improved machinery mounting system for supporting a machine comprising a plurality of mounts, at least one of which comprises a bearing member, means interposed between the bearing member and the floor where the supported machine is located for supporting the bearing member, an adjustable member having a portion intermediate the bearing member and a portion of the supported machine for maintaining a spaced relationship therebetween, a lifting member interposed between the bearing member and the portion of the supported machine and extendable between the bearing member and the portion of the supported machine, said lifting member adapted to bear against the supported machine and also adapted to remove at least a part of the load on the adjustable member during adjustment thereof, a sensor means for producing a signal corresponding to the portion of load force supported on the lifting member, means for activating the lifting member to vary the load force on at least one of the other mounts, and means for indicating the distribution of load force with which the mounts in the system support their respective portions of the machine.

18. The machinery mounting system of claim 17 in which the means for activating the lifting member includes means for presetting a limit upon the operation of the activating means whereby upon activation of the lifting means the force which the lifting means applies to the supported portion of the machine above the mount does not exceed the preset limit.

19. The machinery mounting system of claim 18 in which the activating means is a pressure regulator.

20. An improved machinery mounting system for supporting a machine comprising a plurality of mounts, each of which comprises a bearing member, means interposed between the bearing member and the floor of the area where the supported machine is located for supporting the bearing member, an adjustable member having a portion intermediate the bearing member and a portion of the supported machine for maintaining the spaced relationship therebetween, a fluidic lifting member interposed between the bearing member and the portion of the supported machine and extendable to remove at least a part of the load on the adjustable member during adjustment thereof, the fluidic lifting member being connected to a source of fluidic pressure through a fluid carrying line, a sensor means for producing a signal corresponding to the load force with which the supported portion of the machine is supported, means for activating the lifting member independently to vary the load force on at least one of the other mounts, and means for indicating the distribution of load force with which the mounts in the system support their respective portions of the machine.

21. The machinery mounting system of claim 20 in which the means for activating the lifting member is a valve in the fluid carrying line.

22. A machinery mounting system of claim 20 in which the means for indicating the distribution of load force is a pressure meter.

* * * * *